Patented June 16, 1953

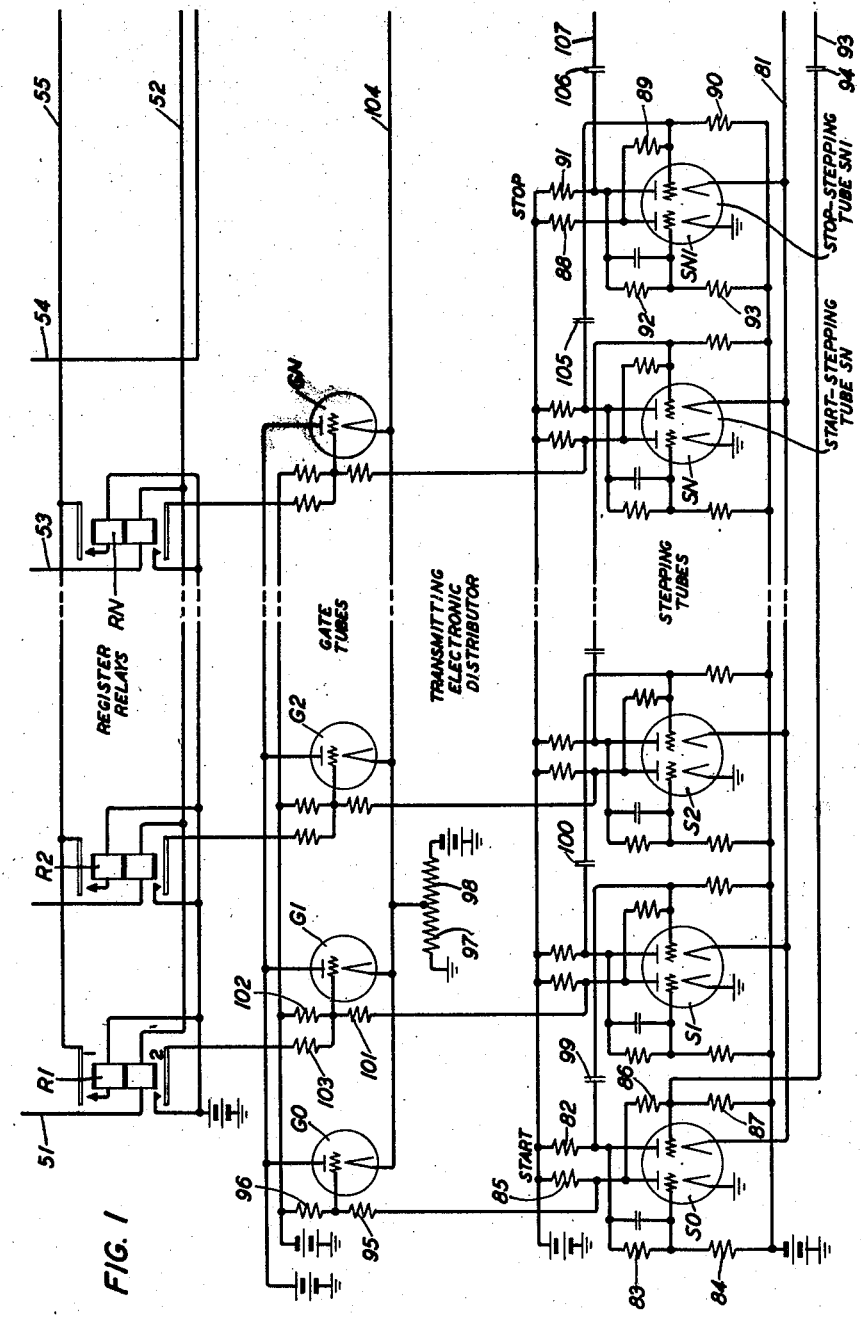

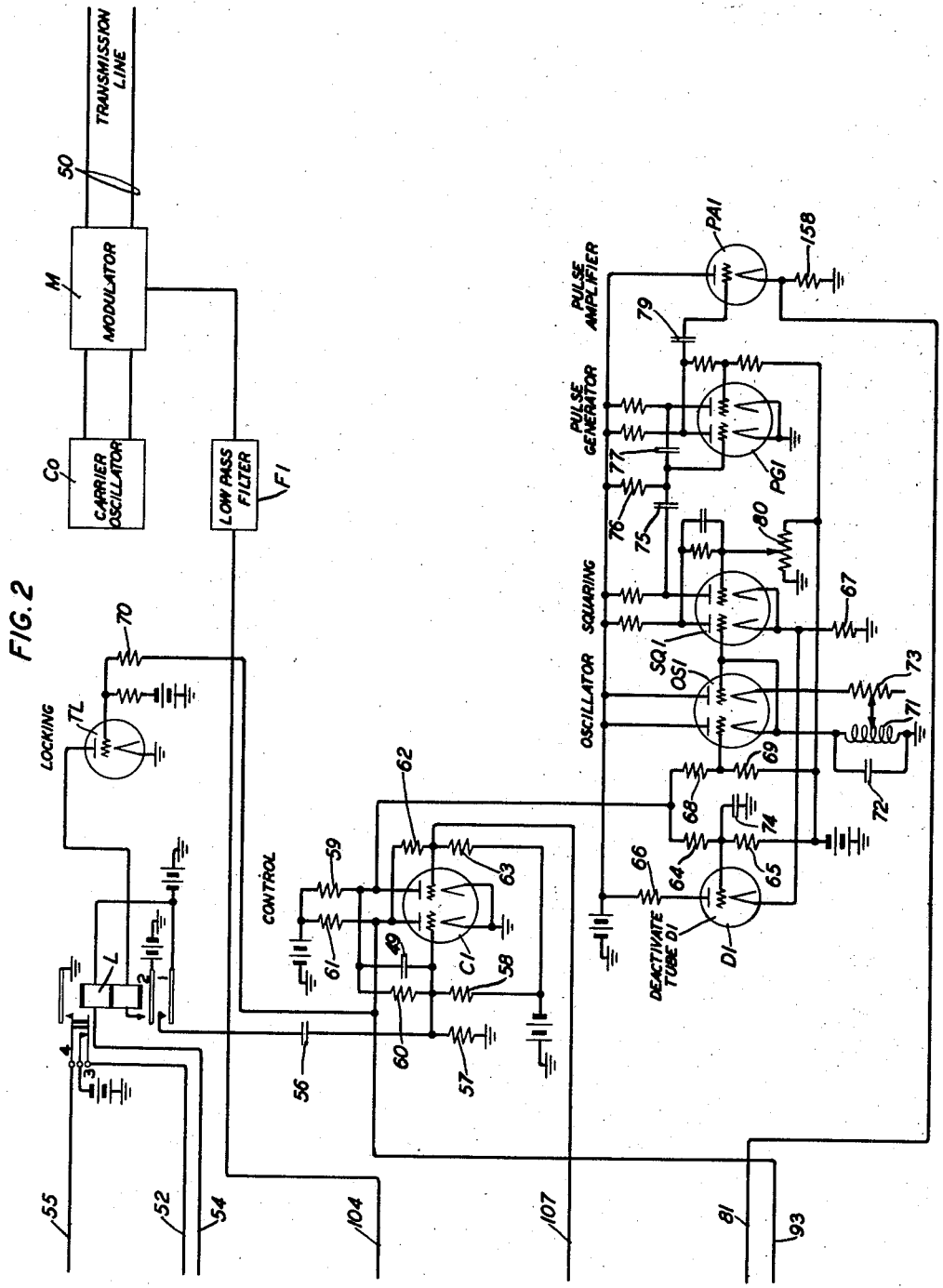

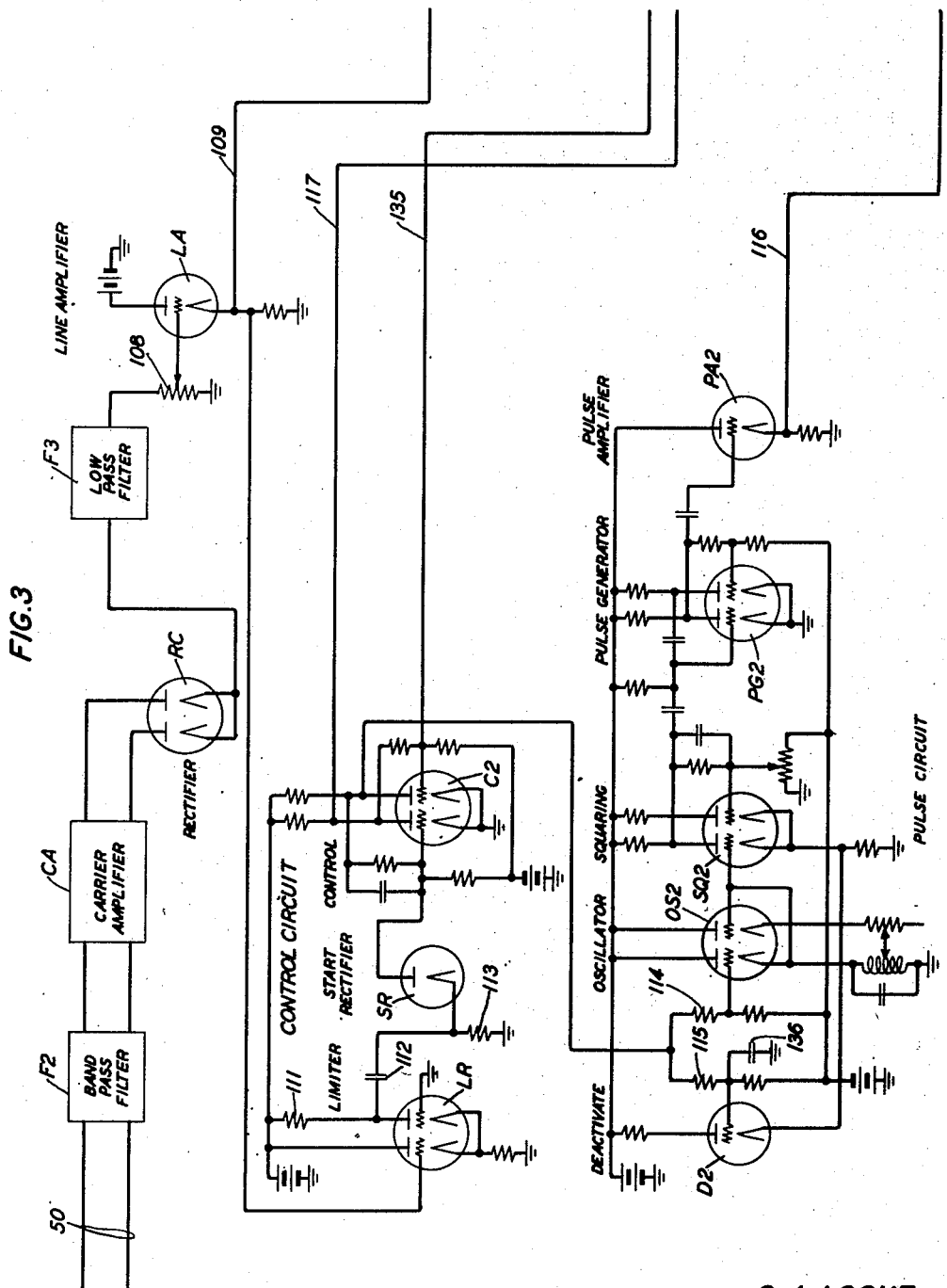

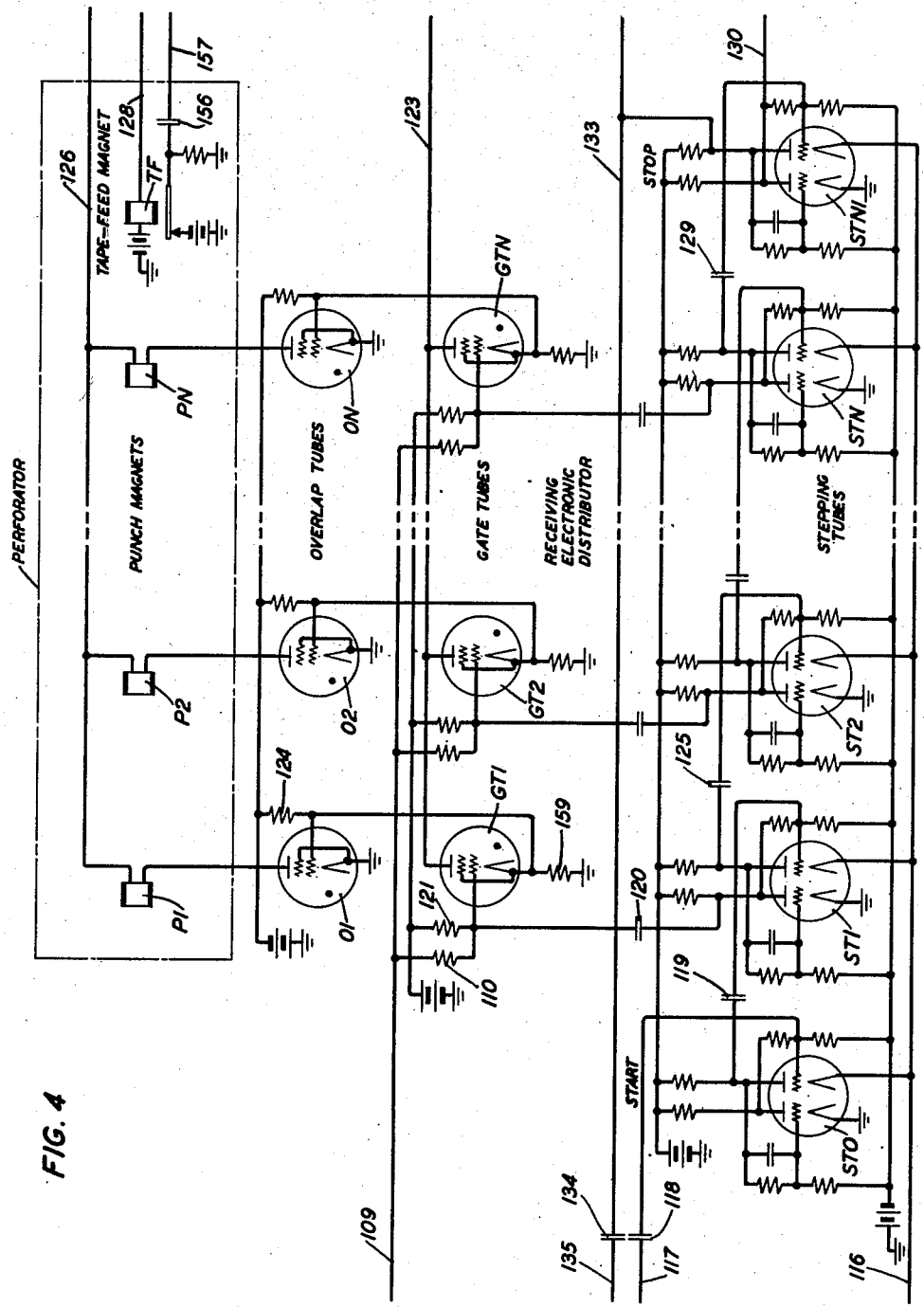

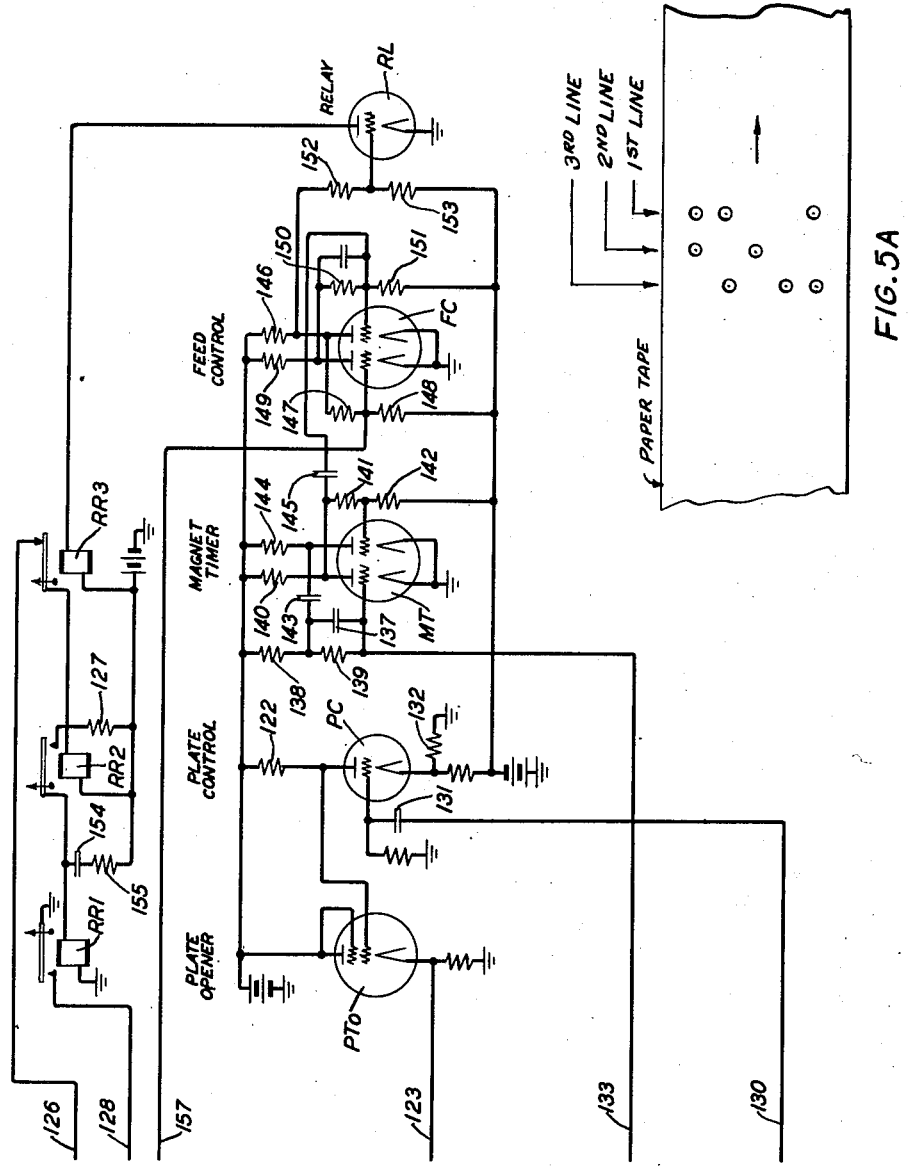

2,642,493

UNITED STATES PATENT OFFICE 2,642,493

AUTOMATIC MESSAGE ACCOUNTING SYSTEM

George A. Locke, Glenwood Landing, and Allan Weaver, Port Washington, N. Y., assignors to Bell Telephone Laboratories, Incorporated, New York, N. Y., a corporation of New York Application February 27, 1947, Serial No. 731,396

8 Claims. (Cl. 178—17.5)

This invention pertains to signaling systems and more particularly to systems employing time-spaced electrical impulses. It is especially adapted to the transmission and recording at a distant point of electrically registered information such, for example, as items of information relating to telephone calls automatically registered in telephone offices. It is, however, applicable to the transmission and reception of intelligence of any kind that can be indicated by the closure of electrical contacts.

A feature of the invention is the employment of electronic distributors as a means for producing time-spaced impulses both for transmitting and for receiving signals.

Another feature of the invention is a means for controlling a recording device for recording received signals.

Still another feature of the invention is a means whereby the signaling system may operate independently of the recording device.

These and other features of the invention will be more clearly understood from the accompanying description, the appended claims, and the drawings, in which:

Fig. 1 shows the transmitting electronic distributor and the register circuits;

Fig. 2 shows the pulse and control circuits of the transmitter and the transmitting portion of the transmission system;

Fig. 3 shows the pulse and control circuits of the receiver and the receiving portion of the transmission system;

Fig. 4 shows the receiving electronic distributor and the recording device;

Fig. 5 shows the timing circuit of the recording device; Fig. 5A shows a sample of the recording medium with signals recorded thereon, and Fig. 6 shows how the above figures should be placed with relation to one another to completely disclose the invention.

An electronic distributor of the type employed in the present embodiment of the invention comprises a series of "stepping" tubes which are successively actuated or "triggered" by pulses initiated by a source of oscillations to produce a succession of time-spaced impulses. In the transmitting distributor, a combination of the impulses so produced, representing the information to be transmitted, is selected by "gate" tubes and transmitted by suitable means over an electrical circuit to the receiver. The receiver comprises a similar electronic distributor producing impulses in time relationship to the impulses of the electronic distributor of the transmitter. The coincidence of each signal from the transmitter with an impulse from the electronic distributor of the receiver actuates one of a series of "gate" tubes in the receiver. The combination of gate tubes thus actuated in the receiver indicates the information received and is used to control a recording device to record the information. The impulses employed for sending and receiving are of relatively short duration but the indication of the gate tubes of the receiver is retained until the recording device has operated. In the present invention, the signals thus registered by the receiving electronic distributor actuate a recording device to record the signals.

Electronic distributors of the type described are capable of operating at a speed much higher than that at which known types of recording devices will operate. In the present embodiment of the invention, a recording device of the perforating type having punches operated by magnets and recording on a continuous strip of paper is employed. This is a simple and cheap form of recorder but its speed is limited by the operating and releasing time of the magnets and the necessity of advancing the paper strip after each line has been recorded. Means are therefore required to control the recording device independently of the signal transmitting and receiving means after a group of signals has been received. Nevertheless, it is undesirable to prevent the transmitting and receiving devices from functioning to transmit and register a second group of signals while the recorder is recording a first group of signals, as that would further slow down the operation of the system. Precise timing of the cooperating elements of the system is necessary to attain the highest operating speed of the system, and, for this purpose, electronic means of control are the most effective. The present invention discloses a novel arrangement of electronic means whereby the operations of the system are accurately regulated to the operating speed of the recording device yet the maximum over-all operating time of the system is attained.

This feature of the invention will be more clearly understood from the detailed description of the construction and operation of the invention which follows.

In the drawings, tubes S0, S1, S2 . . . SN, SN1 are the stepping tubes of the transmitter. Tube S0 is used to start the action of the transmitter for each cycle of operations and tube SN1 to stop said action. The number of the remaining stepping tubes S1, S2 . . . SN is equal to the maximum number of the signals which may be transmitted in one cycle of operations of the transmitter. The number of said signals is limited only by the number of stepping tubes provided. The stepping tubes are shown as double-triode tubes but double the number of single-triode tubes could be used or any combination of single and double-triode tubes of any suitable type could be used. Tubes G0, G1, G2 . . . GN are the gate tubes of the transmitter. These are shown as single-triode tubes but two or more triodes may, of course, be combined in one envelope, if desired, or other tubes having suitable characteristics may be employed. Tube G0 is used for starting the action of the transmitter and is associated with the start stepping tube S0. Each of the remaining gate tubes G1, G2 . . . GN is respectively associated with one of the stepping tubes S1, S2 . . . SN and the number of said gate tubes is, therefore, equal to the number of said stepping tubes.

In the present embodiment of the invention, it is assumed that the information to be transmitted is registered by relays R1, R2 . . . RN, one relay being provided for each of the gate tubes G1, G2 . . . GN. Since each relay serves only to complete a simple circuit, it is obvious that other means of indicating the information to be transmitted could be employed, such as vacuum tubes or mechanically operated contacts. Relay L and tube TL are provided to lock up those of relays R1, R2 . . . RN which are operated to indicate the information to be transmitted, and also for starting the action of the transmitter when required to transmit signals. Other suitable means may, of course, be used for this purpose.

The pulse circuit of the transmitter comprises the tubes D1, OS1, SQ1, PG1 and PA1. Tube OS1 is an oscillator of well-known form. Tube PG1 is provided to produce pulses from the oscillations of tube OS1 and tube SQ1 is provided to ensure that the pulses will be sharp and of square form. Tube D1 is for starting and stopping the action of the oscillator OS1 and tube PA1 is a pulse amplifier, of common form. All of these tubes may be of any type suitable for the purposes intended. Alternately other means of producing suitable pulses may be used. Tube C1 is a control tube for controlling the operation of the transmitter. While a double-triode tube is shown, two single-triode tubes may, of course, be used or other suitable type of tube.

In the present embodiment of the invention, modulation of a carrier frequency is employed for transmitting the signals from the transmitter to the receiver. The signals to be transmitted are passed through a suitable low-pass filter F1, to reduce the superimposed harmonics, to a modulator M adapted to modulate the carrier frequency of an oscillator CO or other source of said frequency, for transmission over the transmission line 50. At the receiving end of said transmission line, a band-pass filter F2, suitable to the carrier frequency employed, and a carrier amplifier CA are provided. The rectifier tube RC is for rectifying the carrier signal, while the line amplifier tube LA is provided to amplify the signal after passage through a suitable low-pass filter F3. This method of signal transmission is one commonly used and the circuits and equipment indicated schematically by boxes are so well known that it is not believed necessary to show and describe their construction and operation in detail. Other suitable methods and apparatus for the transmission of the signals will occur to anyone versed in the art, and these may also be employed for the purpose of this invention.

Tubes ST0, ST1, ST2 . . . STN, STN1 are the stepping tubes of the receiver, corresponding to stepping tubes S0, S1, S2 . . . SN, SN1 of the transmitter, and are similarly arranged. The number of stepping tubes in the receiver is the same as the number in the transmitter. Tubes GT1, GT2 . . . GTN are the gate tubes of the receiver corresponding to tubes G1, G2 . . . GN of the transmitter. In the receiver, no gate tube is necessary in conjunction with the start stepping tube ST0. However, in the receiver it is convenient to use gas tubes for the gate tubes, although, of course, other types of tubes having the required characteristics could be used.

The pulse circuit of the receiver comprises the tubes D2, OS2, SQ2, PG2 and PA2 and is similar to the pulse circuit of the transmitter. Tube C2 is the control tube for the receiver, corresponding to tube C1 of the transmitter, and is supplemented by the limiter tube LR and the start rectifier tube SR for actuating the control tube C2.

In its present embodiment, the invention is used in connection with a recording device or perforator of the type disclosed in the W. W. Carpenter U. S. Patent No. 2,583,086 issued on January 22, 1952 for recording the received signals. This type of perforator has a plurality of magnets P1, P2 . . . PN each controlling a punch for punching a hole or depression in a paper tape. The number of said punches should be equal to the number of gate tubes GT1, GT2 . . . GTN. The combination of holes or depressions punched in a line across the tape by one operation of a combination of said punches records the information received in one cycle of operations of the receiver. A tape-feed magnet TF, when operated and released, as will be subsequently described, advances the tape to a new position for punching another line of holes or depressions to record the information received in the next cycle of operations of the receiver. To control the perforator for recording successive lines of holes or depressions, a timing circuit comprising the tubes PT0, PC, MT, FC and RL and the relays RR1, RR2 and RR3 is provided. An overlap tube O1, O2 . . . ON is also provided for each of the magnets P1, P2 . . . PN to ensure that sufficient time is allowed for the correct operation of the punch or punches controlled by said operated magnet or magnets, respectively. While it is convenient to use gas tubes for the overlap tubes, as indicated, other tubes or devices having the desired characteristics could, of course, be used in place of said tubes. The invention is not limited to use in connection with said perforator nor with any particular recording device. Any recording or other device capable of utilizing the indications of the receiver in a similar manner may be employed.

The information to be transmitted from the transmitting circuit to the receiving circuit and recorded by the perforator is registered, as said before, by operating the appropriate combination of relays R1, R2 . . . RN. This is accomplished by grounding by any suitable means the corresponding combination of the conductors, such as conductors 51 and 53, to the lower windings of relays RI and RN, respectively. When conductor 51 is grounded, a circuit is completed from battery through No. 3 contact of relay L, conductor 52, lower winding of relay RI, and conductor 51 to ground, operating relay RI. When conductor 53 is grounded, relay RN is operated in a similar manner. When the desired combination of relays is thus operated, conductor 54 is momentarily grounded by any suitable means, operating relay L over an obvious circuit. The operating circuits of relays RI, R2 . . . RN are thereby opened at No. 3 contacts of relay L, but those of said relays which were operated are locked up. For example, if relay RI is operated, it is locked up over a circuit extending from battery through its upper winding and No. 1 contacts, conductor 55, and No. 4 contacts of relay L to ground. Other operated relays R— are similarly locked to ground on the No. 4 contacts of relay L.

The No. 2 contacts of relay L connect positive battery through the lower winding of said relay to the anode of locking tube TL. The No. 1 contacts of relay L connect negative battery to condenser 56, charging said condenser through resistance 57 to ground. The charging current makes the left control grid of control tube CI momentarily more negative. Said control grid is so biased by positive battery through resistances 59 and 60 and negative battery through resistance 58 that the left triode of said tube normally conducts over an obvious circuit. The right control grid of said tube is so biased by positive battery through resistances 61 and 62 and negative battery through resistance 63 that the right triode does not normally conduct. By the operation of relay L, as described above, the left control grid of tube CI is made sufficiently more negative to arrest conduction in the left triode of said tube. The resultant rise of positive potential at the left anode is transmitted through resistance 62 to the right control grid, raising the potential of said control grid sufficiently to permit the right triode to conduct. The resultant reduction of positive potential at said right anode transmitted through resistance 60 to the left control grid prevents the possibility of the left triode starting to conduct again, the charging time of condenser 49 slightly delaying the reduction of positive potential at the left control grid until the pulse from condenser 56 has decayed. Conduction in the control tube CI, therefore, suddenly shifts from the left triode to the right triode. This action, familiar to everyone versed in the electronic art is commonly known as "triggering to the right." A similar action, in which conduction suddenly shifts from the right triode of a tube to the left triode is known as "triggering to the left." As these actions occur frequently in the circuits of the present invention, the above terms will be used in order not to unduly lengthen the description, and it is to be understood that an action so indicated is similar to that described above for tube CI.

The increase of positive potential at the left anode of tube CI consequent upon the cessation of conduction in the left triode of said tube is transmitted through resistance 70 to the control grid of the locking tube TL causing the latter tube, which does not normally conduct, to conduct and thereby lock up relay L over a circuit extending from battery through the No. 2 contacts and lower winding of said relay and the anode-cathode space of said tube to ground.

The rise of positive potential at the left anode of tube CI is also transmitted over conductor 93, producing a pulse of positive potential from condenser 94 to the right control grid of tube SO with an effect which is described later.

The control grid of the deactivate tube DI is so biased by positive battery through resistances 59 and 64 and by negative battery through resistance 65 that said tube normally conducts over a circuit extending from battery through resistance 66, the anode-cathode space of said tube, and resistance 67 to ground. The cathodes of the squaring tube SQI are, therefore, at positive potential. Positive battery through resistances 59 and 68 and negative battery through resistance 69 also bias the left control grid of the oscillator tube OSI so that the left anode of said tube conducts through inductance 71 to ground, charging condenser 72 and supplying positive potential to the left control grid of the squaring tube SQI. This potential is, however, insufficient to cause the left triode of tube SQI to conduct so long as the cathodes of said tube are maintained at positive potential by the deactivate tube DI.

When, however, the control tube CI triggers to the right, as described above, the decrease of positive potential at its right anode transmitted through resistance 68 to the left control grid of the oscillator tube OSI arrests conduction in the left triode of the latter tube. The energy stored in condenser 72, discharging through inductance 71, sets up oscillations which are transmitted to the right control grid of tube OSI, in the right triode of which they are amplified. A portion of the amplified oscillations is fed back from the right cathode of tube OSI through potentiometer 73 to inductance 71 to sustain oscillation. Said potentiometer is adjusted so that oscillations of nearly constant amplitude are sustained for the period required by one cycle of operations of the transmitting and receiving circuits hereinafter described.

The drop in positive potential at the right anode of control tube CI when said tube triggers to the right is also transmitted through resistance 64 to condenser 74 which is thereby partially discharged, lowering the potential of the control grid of the deactivate tube DI so that said tube ceases to conduct, thereby removing the positive potential from the cathodes of the squaring tube SQI.

The first negative half-cycle of oscillations from the left cathode of tube OSI to the left control grid of the squaring tube SQI has no material effect upon the latter tube, merely making said control grid more negative. The positive potential of the next half-cycle, however, causes tube SQI to trigger to the left (the right triode of said tube being normally conducting). The consequent rise of positive potential at the right anode of said tube produces, through condenser 75, a positive pulse at the left control grid of the pulse generator tube PGI. Said control grid is so biased by positive battery through resistance 76 that the left triode of tube PGI normally conducts over an obvious circuit. The positive pulse, therefore, has no material effect upon tube PGI. On the next negative half cycle from tube OSI, the left control grid of tube SQI is made more negative so that said tube triggers to the right, producing a negative pulse through condenser 75 to the left control grid of tube PGI which causes tube PGI to trigger to the right. The consequent drop of potential at the right anode of said tube permits condenser 77 to partially discharge, raising the potential at the left control grid of tube PGI so that said tube triggers to the left again after an interval determined by the capacity of condenser 77 and the characteristics of said tube. On the next positive half cycle from tube OSI, tube SQI triggers to the left again and the cycle of operations described above is repeated as long as oscillations are produced by tube OSI. Tube PGI, triggering alternately to the right and to the left, produces, at its left anode, short positive pulses which are given a square form by the trigger action of tube SQI. Said pulses are transmitted through condenser 79 to the control grid of the pulse amplifier PAI which may be of any suitable well-known type. By means of potentiometer 80 the bias on the right control grid of tube SQI may be adjusted to regulate the interval between the impulse, described above, from the control tube CI to tube OSI and the first pulse produced by tube PGI.

The amplified pulses from the cathode of the amplifier tube PAI are transmitted over conductor 81 to the right cathodes of all the stepping tubes S0, S1, S2 . . . SN, SNI. The control grids of said tubes, except tube SNI, are so biased that the left triodes of said tubes (except tube SNI) normally conduct over obvious circuits but the right triodes do not. For example, the left control grid of tube S0 is biased by positive battery through resistances 82 and 83 and negative battery through resistance 84, and the right control grid of said tube is biased by positive battery through resistances 85 and 86 and negative battery through resistance 87. On the other hand, the right control grid of the stop stepping tube SNI is so biased by positive battery through resistances 88 and 89 and negative battery through resistance 90 that the right triode of said tube normally conducts over a circuit extending from positive battery through resistance 91, the anode-cathode space of said tube, conductor 81, and resistance 158 to ground. The left control grid of said tube is biased by positive battery through resistances 91 and 92 and negative battery through resistance 93 so that the left triode does not normally conduct.

When the control tube CI triggers to the right and conduction in the left triode thereby ceases, a positive pulse is produced from condenser 94 to the right control grid of the start stepping tube S0, so that, as previously described, said start stepping tube triggers to the right. The resultant rise of potential at the left anode of said tube is transmitted through resistance 95 to the control grid of tube G0. Said control grid is so biased by negative battery through resistance 96 and positive battery through resistances 85 and 95 that said tube G0 does not conduct if tube S0 is conducting through its left triode, but will conduct if tube S0 is not conducting through its left triode. Tube S0, now conducting through its right triode only, tube G0 conducts over a circuit extending from positive battery through the anode-cathode space of said tube and resistance 97 to ground. By the drop of positive potential at the right anode of tube S0, a negative pulse is also produced from condenser 99 to the right control grid of tube SI which, since latter said tube is not conducting through its right triode, had no material effect.

The start stepping tube S0 having triggered to the right, as described above, it and the stop-stepping tube SNI are now conducting through their right triodes only, while the remainder of the stepping tubes S1, S2 . . . SN are conducting through their left triodes only. When the first positive pulse from amplifier PAI is received over conductor 81 at the right cathodes of the stepping tubes, raising the potential of all of said cathodes, the start stepping tube S0 and the stop-stepping tube SNI, which are conducting through their right triodes, trigger to the left. The remainder of the stepping tubes are not affected since they are not conducting through their right triodes. When the start-stepping tube S0 triggers to the left, the potential of its left anode falls, arresting conduction in tube G0, and the potential of its right anode rises, producing a positive pulse from condenser 99 to the right control grid of tube SI which causes the latter tube to trigger to the right.

A negative pulse is thereby produced through condenser 100 to the right control grid of tube S2, which tube, however, is not affected thereby inasmuch as it is not conducting through its right triode. The rise of positive potential at the left anode of tube SI is transmitted through resistance 101 to the control grid of tube GI. Said control grid is so biased by negative battery through resistance 102, that said tube does not normally conduct, nor will it be caused to conduct by the increase of potential transmitted to its control grid from tube SI unless the potential of said control grid is further raised by positive battery through No. 2 contacts of relay RI and resistance 103. When tube SI triggers to the right, therefore, tube GI conducts if relay RI is operated and does not conduct if relay RI is not operated.

Upon the next positive pulse from amplifier PAI, tube SI triggers to the left, quenching tube GI and producing a positive pulse through condenser 100 to the right control grid of tube S2, causing the latter tube to trigger to the right. The action is then the same as that described above for tubes S0, S1, and G0, and the effect upon tube G2 is similar to that described for tube GI; tube G2 being arranged with respect to relay R2 in the same manner as tube GI is arranged with respect to relay RI. Tube G2, therefore, now conducts if relay R2 is operated and does not conduct if relay R2 is not operated.

Successive pulses from amplifier PAI actuate successive stepping tubes in the manner described above, and gate tubes G— whose associated relays R— are operated, successively conduct. Each time a gate tube conducts, the potential at its cathode is raised and thereby a positive pulse is produced on conductor 104. The time-spacing of said pulses corresponds to the combination of the relays RI, R2 . . . RN operated and, therefore, indicates the information registered by said operated relays.

Each time a positive pulse is applied to conductor 104, as described above (including the pulse from tube G0), it is transmitted through filter F1, which suppresses harmonics, to modulator M which thereupon permits carrier frequency from the source CO to go out over line 50 through filter F2 to carrier amplifier CA by which said frequency is amplified and applied to the anodes of the rectifier tube RC. The direct-current impulse thereby produced from the cathodes of said tube is transmitted through filter F3, which suppresses alternating-current components, and through potentiometer 108 to ground. A portion of the energy from potentiometer 108 is conveyed to the control grid of the line amplifier tube LA, and an amplified signal is thus obtained from the cathode of said amplifier tube.

The amplified signals are transmitted over conductor 109 through resistances, such as resistance 110, to raise the potential of the control grids of the gate tubes GT1, GT2 . . . GTN, and are also transmitted to the left control grid of the limiter tube LR. The latter tube is a cathode follower, both triodes of which normally conduct over obvious circuits. Each positive pulse thus applied to the left control grid of said tube increases conduction in the left triode with a consequent increase in the potential of the cathodes, which causes a fall in the conduction of the right triode and an increase of the potential of the right anode due to the ohmic resistance of resistor 111. The charging and discharging of condenser 112 to ground through resistance 113 by the resultant changes in the potential of the right anode of tube LR, produce positive and negative pulses at the cathode of the start rectifier tube SR. A part of each negative pulse is rectified by said tube and delivered to the left control grid of control tube C2. This tube is similar to and operates in the same manner as tube C1 of the transmitter control circuit, normally conducting through its left triode and normally non-conducting through its right triode.

The first negative pulse received at the left control grid of tube C2 is the result of the decay of the first positive pulse from line amplifier tube LA which, in turn, results from the first carrier signal transmitted in response to the conduction of gate tube G0. Said negative pulse causes control tube C2 to trigger to the right in the manner described for tube C1. The resultant drop of potential at the right anode of tube C2 is transmitted through resistance 114 to the left control grid of oscillator tube OS2, which, being similar to oscillator tube OS1, thereupon oscillates in the manner already described for the latter tube. Said drop of potential is also transmitted through resistance 115 to the control grid of deactivate tube D2 which is similar to and operates in the same manner as deactivate tube D1. The squaring tube SQ2, pulse generator tube PG2, and pulse amplifier tube PA2 are similar to and operate in a similar manner to tubes SQ1, PG2 and PA2, respectively, in the transmitting circuit, except that the impulses to pulse-generator tube PG2 are taken from the left anode of tube SQ2, whereas it will be recalled that the impulses to pulse-generator tube PG1 are taken from the right anode of tube SQ1. In the transmitting circuit, therefore, the first pulse from pulse-generator tube PG1 is produced on the second negative swing of the oscillator cycle while, in the receiving circuit, the first pulse is produced by pulse-generator tube PG2 on the first positive swing of the oscillator cycle. It will be observed that control tube C2 is activated by a negative pulse which is the result of the decay or downward swing of the pulse produced by the conduction of gate tube G0 and transmitted by means of carrier, as described, over line 50 to the receiving equipment. Gate tube G0 is not associated with any of the register relays R1, R2 . . . RN and, therefore, the pulse produced by its conduction is not part of the signals representing the registered information. If oscillators OS1 and OS2 are adjusted to oscillate at the same frequency, the first pulse produced by pulse-generator tube PG2 will occur one-half cycle after the decay of the pulse produced by gate tube G0 and, therefore, will coincide with the pulse produced in response to gate tube G1, if said tube conducts to transmit a part of the signals representing the registered information. Successive pulses produced by pulse-generator tube PG2 will also coincide with signal pulses transmitted over line 50 as the result of the conduction of other gate tubes in the transmitting circuit. These impulses are amplified by the amplifier tube PA2.

The positive pulses produced by pulse-generator tube PG2 and amplified by tube PA2 are transmitted over conductor 116 to the right cathodes of the stepping tubes ST0, ST1, ST2 . . . STN, STN1 and affect said stepping tubes in the same way as the pulses from pulse-generator tube PG1 affect stepping tubes S0, S1, S2 . . . SN, SN1, as previously described. When the control tube C2 triggers to the right as a result of the first negative pulse from the start-rectifier tube SR, the rise of potential at the left anode of said control tube, transmitted over conductor 117, produces a positive pulse from condenser 118 to the right control grid of the start stepping tube ST0, causing said tube to trigger to the right. A negative pulse is thereby produced through condenser 119 to the right control grid of tube ST1 which has no material effect since the latter tube is not conducting through its right triode. The first positive pulse from pulse-generator tube PG2 causes the start stepping tube ST0 and the stop stepping tube STN1 to trigger to the left. A positive pulse is thereby produced through condenser 119 to the right control grid of tube ST1 which causes said tube to trigger to the right. The resultant increase of potential at the left anode of tube ST1 produces a positive pulse from condenser 120 to the control grid of gate tube GT1.

The plate opener tube PTO normally conducts over an obvious circuit, its control grid being normally maintained at positive potential by positive battery through resistance 122. Its cathode is, therefore, at positive potential, which is connected over conductor 123 to the anodes of the gate tubes GT1, GT2 . . . GTN. The control grids of said gate tubes are, however, biased by negative battery through resistances, such as resistance 121, so that said tubes do not normally conduct, nor will any of them conduct when a positive pulse is supplied by the associated stepping tube, as described above, unless, at the same time, additional positive potential is supplied from line amplifier LA to the control grid over conductor 109.

As pointed out above, the first positive pulse from pulse generator tube PG2 will coincide with the signal resulting from the conduction of gate tube G1 of the transmitter, if the latter tube conducts, in which event a positive pulse is supplied from line amplifier tube LA over conductor 109 and, through resistance 110, to the control grid of gate tube GT1 at the same time that a positive pulse is supplied to said control grid of this tube from condenser 120. Gate tube GT1 thereby becomes conducting. If gate tube G1 of the transmitter does not conduct, no positive pulse will be supplied from amplifier tube LA to the control grid of gate tube GT1 of the receiver and said latter tube does not conduct. If gate tube GT1 becomes conducting, it conducts over a circuit extending from positive potential at the cathode of plate opener tube PTO over conductor 123, the anode-cathode space of tube GT1 and resistance 159 to ground. Being a gas tube, it continues to conduct after the positive pulses to its control grid cease.

The next positive pulse from pulse generator tube PG2 causes stepping tube ST1 to trigger to the left, the resultant rise of potential at the right anode of said tube producing a positive pulse from condenser 125 to the right control grid of tube ST2, causing the latter tube to trigger to the right. The effect on gate tube GT2 is similar to that described for gate tube GT1. If gate tube G2 of the transmitter is conducting, gate tube GT1 conducts and if gate tube G2 is not conducting, gate tube GT2 does not conduct. Successive pulses from pulse-generator tube PG2 successively trigger other stepping tubes, affecting their associated gate tubes in the manner described above. A combination of the gate tubes GT1, GT2 . . . GTN is thereby caused to conduct, which corresponds to the combination of gate tubes G1, G2 . . . GN which conduct. But whereas gate tubes G1, G2 . . . GN conduct but momentarily, gate tubes GT1, GT2 . . . GTN, being gas tubes, will continue to conduct after the termination of the pulses which cause them severally to become conducting.

If relay RR3 is not operated, each of the overlap tubes O1, O2 . . . ON which is associated with a conducting gate tube GT1, GT2 . . . GTN conducts. For example, if gate tube GT1 is conducting, its cathode is thereby made positive, and positive potential is supplied therefrom to the control grid of overlap tube O1, overcoming the negative bias supplied to said control grid by negative battery through resistance 124. Tube O1 thereupon conducts over a circuit extending from positive battery through the winding of relay RR2, contacts of relay RR3, conductor 126, winding of magnet P1, and anode-cathode space of tube O1 to ground. Magnet P1 operates over said circuit. Other overlap tubes associated with conducting gate tubes conduct over similar circuits through the windings of their associated punch magnets, operating said magnets. A combination of punches is thereby operated which corresponds to the combination of conducting gate tubes GT1, GT2 . . . GTN in the receiver, which, in turn, corresponds to the combination of conducting gate tubes G1, G2 . . . GN and to the combination of the operated relays R1, R2 . . . RN in the transmitter. The relative positions of the holes or impressions punched in one line of the tape of the perforator by said operated punches as shown in Fig. 5A, therefore, indicate the information registered by relays R1, R2 . . . RN. If relay RR3 is operated, the actions described above will await the release of said relay.

Returning, now, to the transmitting circuit, when stepping tube SN triggers to the right in the manner described for stepping tubes S1 and S2, the drop of potential at its right anode produces a negative pulse from condenser 105 to the right control grid of the stop-stepping tube SN1. Since tube SN1 is conducting through its right triode, said pulse causes said tube to trigger to the left. The increase of positive potential at the right anode of said tube produces a positive pulse from condenser 106 over conductor 107 to the right control grid of control tube C1. This has no material effect since tube C1 is already conducting through its right triode. When, however, tube SN1 is triggered to the right again by a pulse from pulse generator tube PG1, in the same manner as described for other stepping tubes, the drop of potential at its right anode produces a negative pulse from condenser 106 over conductor 107 to the right control grid of control tube C1 which causes said control tube to trigger to the left. The consequent rise of potential at the right anode of said tube, transmitted through resistance 68, raises the potential of the left control grid of oscillator tube OS1 which thereupon ceases to oscillate. By the charging of condenser 74 through resistance 64, the potential of the control grid of deactivate tube D1 is also raised so that said tube conducts once more, supplying positive potential to the cathodes of tube SQ1 to arrest the action of said tube. No more pulses are, therefore, produced by pulse-generator tube PG1.

The fall of potential at the left anode of control tube C1, transmitted through resistance 70, permits the control grid of locking tube TL to become more negative, arresting conduction in said tube and thereby releasing relay L. The locking circuits of relays R1, R2 . . . RN are thereby opened at No. 4 contacts of said relay and relays R1, R2 . . . RN are released, their respective operating circuits being restored by the No. 3 contacts of relay L. The transmitting circuit is, therefore, restored to its normal condition and is ready for the transmission of another group of signals by another cycle of operations.

Meanwhile in the receiving circuit, relay RR2 operates over the circuits previously traced for the operation of magnets P1, P2 . . . PN, completing a circuit from positive battery through resistance 127, contacts of relay RR2, and winding of relay RR1 to ground, over which relay RR1 operates. Tape-feed magnet TF then operates over a circuit extending from battery through the winding of said magnet, conductor 128, and contacts of relay RR1 to ground. The operation of said magnet, however, has no effect on the perforator, inasmuch as the magnet is arranged to feed the tape of said perforator only on its release.

When stepping tube STN triggers to the right in the manner described for other stepping tubes, the consequent drop of potential at its right anode produces a negative pulse through condenser 129 to the right control grid of the stop-stepping tube STN1, by which the latter tube is not affected since it is now conducting through its left triode only. But when tube STN is triggered to the left by a pulse from pulse-generator tube PG2, in the same manner as previously described for other stepping tubes, the rise of potential at its right anode produces a positive pulse from condenser 129 to the right control grid of tube STN1, causing the latter tube to trigger to the right. The consequent rise of potential at its left anode, transmitted over conductor 130, produces a positive pulse from condenser 131 to the control grid of the plate-control tube PC, causing said tube, which does not normally conduct, to conduct over a circuit extending from positive battery through resistance 122, the anode-cathode space of said tube, and resistance 132 to ground. The positive potential at the anode of said tube is thereby lowered, lowering the potential of control grid of the plate-opener tube PTO which thereupon ceases to conduct and thereby removes positive potential from conductor 123 and the anodes of the gate tubes GT1, GT2 . . . GTN. All of said gate tubes which are conducting thereupon cease to conduct.

When the stop-stepping tube STN1 triggers to the right, as described above, the drop of potential at its right anode is transmitted to conductor 133. A negative pulse is thereby produced from condenser 134 over conductor 135 to the right control grid of control tube C2, which causes said tube to trigger to the left. The right anode of said tube thereby becomes more positive, and this increase of positive potential through resistance 114 raises the potential of the left control grid of oscillator tube OS2 so that said tube ceases to oscillate. Said rise of potential through resistance 115 also raises the potential of the control grid of deactivate tube D2 causing said tube to conduct and apply positive potential to the cathodes of squaring tube SQ2, arresting the action of the latter tube. The charging of condenser 136 introduces a slight time delay in said action. Pulse-generator tube PG2, therefore, ceases to produce pulses. The receiving circuit is now restored to normal and ready for the reception of signals.

The decreased positive potential on conductor 133, mentioned above, also makes the left control grid of the magnet-timer tube MT more negative. Said control grid is so biased by positive battery through resistances 138 and 139 that the left triode of said tube normally conducts over an obvious circuit, whereas the right control grid of said tube is so biased by positive battery through resistances 140 and 141 and negative battery through resistance 142 that the right triode of said tube does not normally conduct. When the left control grid is made more negative, as described above, said tube, therefore, triggers to right. The right anode of said tube thereby becomes more negative, permitting condenser 143 to discharge through resistances 138 and 144. Said discharge produces, through condenser 137, a positive pulse to the left control grid of the magnet timer tube MT which causes said tube to trigger back to the left after an interval determined by the capacities of said condensers and the characteristics of said tube. When said tube triggered to the right, the consequent rise in the potential of its left anode produced a positive pulse from condenser 145 to the right control grid of the feed-control tube FC. The left control grid of this tube is so biased by positive battery through resistances 146 and 147 and by negative battery through resistance 148 that the left triode of said tube does not normally conduct while the right control grid is so biased by positive battery through resistances 149 and 150 and negative battery through resistance 151 that the right triode normally conducts over an obvious circuit. The positive pulse to the right triode from tube MT, therefore, has no material effect. However, when tube MT triggers to the left, a negative pulse is produced from condenser 145 to the right control grid of tube FC which arrests conduction in the right triode of the latter tube and said tube triggers to the left. The consequent rise of potential at its right anode is transmitted through resistance 152 to the control grid of relay tube RL, overcoming the negative bias applied to said grid by negative battery through resistance 153 which normally prevents said tube from conducting. Tube RL, therefore, conducts, completing thereby an obvious circuit over which relay RR3 operates, opening the circuits of and releasing all of the punch magnets P1, P2 .... PN which are operated and quenching the associated overlap tubes O1, O2 ... ON. The operations of the magnet-timer tube MT, the feed-control tube FC, the relay tube RL, and relay RL delay the release of the operated punch magnets, and the characteristics of the timing circuit described above are so chosen that said delay is sufficient to permit the correct operation of the punches controlled by said magnets.

When relay RR2 operates, as previously described, any charge on condenser 154 is discharged through resistances 155 and 127. When relay RR3 operates, as described above, the circuit of relay RR2 is thereby opened and relay RR2 releases, opening the circuit of relay RR1. Condenser 154 then charges from positive battery through resistance 155 and through the winding of relay RR1 to ground. The charging current holds relay RR1 operated for some time, but when condenser 154 is charged, the charging current ceases and said relay releases, opening the circuit of and releasing the tape-feed magnet TF which advances the tape of the perforator to a position for punching a new line of holes or impressions. When on the release of said tape-feed magnet TF the contacts thereof close, negative battery is applied to condenser 156 from which a negative pulse is transmitted over conductor 157 to the left control grid of the feed-control tube FC, which causes said tube to trigger to the right. The consequent drop of potential at its right anode is transmitted through resistance 152 to the control grid of the relay tube RL which thereupon ceases to conduct, opening the circuit of and releasing relay RR3. The circuits are thereby restored to their normal condition. Thus, after a group of signals has been received and the punch magnets operated to record the signals, further operations of the perforator are controlled independently of the electronic distributors regardless of whether or not additional signals are transmitted and received, yet the electronic distributors are not prevented from transmitting and receiving such signals.

The operations described above of relays RR1, RR2 and RR3 and tubes FC and RL introduce a delay in the release of the tape-feed magnet TF to ensure that the tape is not advanced before all of the operated punches of the perforator are fully released, and also introduces a delay in the release of relay RR3 to ensure that no punch magnets are reoperated while the tape of the perforator is being advanced. For it will be observed that while the transmitting and receiving circuits are restored to normal and may operate to transmit and receive another series of signals by another cycle of operations before the release of the operated punch magnets, no punch magnet can be reoperated until relay RR3 is released. Relays RR1, RR2 and RR3 are made slow release relays to increase said delays to the amount required for correct operation of the perforator.

What is claimed is:

1. In a signalling system, in combination, a first electron tube distributor for transmitting successive groups of selected signal impulses, a second electron tube distributor responsive to said first electron tube distributor to receive said selected signal impulses, a recording device responsive to said second electron tube distributor to successively record successive groups of said selected signal impulses on a continuous medium, said second electron tube distributor releasing between said successive groups of signal impulses, and electron tube means initially responsive to each operation of said second electronic distributor for successively controlling the recording operations of said recording device and the position of said medium in predetermined cycles subsequent to each release of said second electron tube distributor.

2. In a signalling system, in combination, electronic means for producing signal impulses, electronic means for receiving said impulses, electronic means for storing selective conditions corresponding to said signal impulses, a recorder comprising a recording medium and magnets, said magnets being responsive to said storing means for recording said signal impulses upon said recording medium, means for advancing said medium, and electronic means responsive to said electronic receiving means to release said magnets, to restore said storing means after a predetermined interval, and to actuate said medium-advancing means at a predetermined interval after the release of said magnets.

3. In a signalling system, in combination, electronic means for producing successive groups of signal impulses, electronic means for receiving said impulses, electronic means for storing selective conditions corresponding to each of said successive groups of signal impulses, a recorder comprising a recording medium and magnets, said magnets being responsive to said storing means for recording a group of said signal impulses upon said recording medium, means for advancing said medium, and electronic means responsive to said electronic receiving means to release said magnets, restore said storing means, and actuate said medium-advancing means while said electronic means for producing signal impulses is producing and said electronic means for receiving signal impulses is receiving a second group of signal impulses.

4. In a signaling system, the combination with registering means operated to register a signal, of a first electron tube distributor responsive to said operated registering means for producing electrical conditions indicative of said signal, a second electron tube distributor responsive to said electrical conditions to produce other electrical conditions indicative of said signal, a recording device settably responsive to the electrical conditions produced by said second electron tube distributor for recording the signal expressed by said last-mentioned electrical conditions, said second electron tube distributor releasing after operation to produce said other electrical conditions, and electronic means initially responsive to the operation of said second electron tube distributor for sustaining the operation of said recording device subsequent to the release of said second electron tube distributor and until all the electrical conditions constituting the signal have been recorded.

5. In a signaling system, the combination with registering means operated to register a signal, of a first electronic means for producing time-spaced impulses, a first electronic gating means jointly responsive to said operated registering means and to the operation of said first electronic means for marking a combination of said impulses to indicate said signal, a second electronic means responsive to said first electronic means for producing impulses in time coordination with the impulses produced by said first electronic means, a second electronic gating means jointly responsive to the operation of said second electronic means and to said selected combination of marked impulses for producing selective conditions indicative of said signal, said second electronic means releasing after the operation of said second electronic gating means, a recording device settably responsive to the operation of said second electronic gating means to record said selective conditions, and electronic means initially responsive to the operation of said second electronic means for sustaining the operation of said recording device subsequent to the release of said second electronic means and until all of said selective conditions indicative of said signal have been recorded.

6. In a signaling system, the combination with registering means operated to register a signal, of a transmitter comprising a first electron tube distributor responsive to said operated registering means to produce electrical conditions indicative of said signal, a receiver comprising a second electron tube distributor responsive to said first electronic distributor to produce selective conditions corresponding to said signal, means responsive to the operation of said second electron tube distributor for storing said selective conditions, said second electron tube distributor releasing subsequent to the operation of said storing means, a recording device responsive to the operation of said storing means for recording said selective conditions, and electronic means initially responsive to the operation of said receiver for sustaining the operation of said recording device subsequent to the release of said receiver and until all of said selective conditions have been recorded.

7. In a signaling system, the combination with registering means operated to register a signal, of a first electronic means for producing time-spaced impulses, electronic means jointly responsive to said operated registering means and to said first electronic means for marking a combination of said impulses to indicate said signal a second electronic means for producing impulses coordinated in time with the impulses produced by said first electronic means, electronic gating means responsive to the coincidence of each marked impulse in said selected combination of marked impulses with a corresponding time-spaced impulse produced by said second electronic means, electronic storing means responsive to the operation of said second impulse producing means for storing selective conditions corresponding to said coincident impulses and indicative of said signal, said second impulse producing means releasing subsequent to the operation of said electronic storing means, a recording device responsive to said electronic storing means for recording said stored selective conditions, and electronic means initially responsive to said second electronic impulse-producing means for sustaining the operation of said recording device subsequent to the release of said second impulse-producing means and until all of said stored selective conditions have been recorded.

8. In a recording system, in combination with registering means recurrently settable to register a signal, a first means operative in response to a setting of said registering means for producing time-spaced electrical impulses, means jointly responsive to a setting of said registering means and to the operation of said first impulse-producing means for marking a combination of said impulses to indicate said signal, a second means operative to produce electrical impulses which are coordinated in time with the impulses produced by said first impulse-producing means, means responsive to the coincidence of each marked impulse in said selected combination of impulses with corresponding impulses produced by said second impulse-producing means to indicate said signal, means for storing selective conditions corresponding to said combination of coincident impulses, a recording device responsive to said storing means for recording said selective conditions, and electronic means responsive to said second impulse-producing means for releasing said latter means and for sustaining the operation of said recording device until all of said stored selective conditions have been recorded, said second impulse-producing means being operative during the sustained operation of said recording device under the control of said electronic means to produce impulses coincident with another selected combination of impulses produced by said first impulse-producing means in response to a succeeding setting of said registering means to register another signal.

GEORGE A. LOCKE.
ALLAN WEAVER.

References Cited in the file of this patent

UNITED STATES PATENTS

| Number | Name | Date |
|---|---|---|
| 2,210,577 | Fitch | Aug. 6, 1940 |
| 2,369,662 | Deloraine et al. | Feb. 20, 1945 |
| 2,394,990 | Eisler et al. | Feb. 19, 1946 |
| 2,400,574 | Rea et al. | May 21, 1946 |
| 2,409,229 | Smith, Jr. et al. | Oct. 15, 1946 |
| 2,444,950 | Nichols et al. | July 13, 1948 |
| 2,451,859 | Mumma et al. | Oct. 19, 1948 |
| 2,465,355 | Cook | Mar. 29, 1949 |
| 2,467,257 | Desch et al. | Apr. 12, 1949 |
| 2,467,929 | Colt | Apr. 19, 1949 |
| 2,536,578 | Slayton | Jan. 2, 1951 |
| 2,585,282 | Slayton | Feb. 12, 1952 |
| 2,595,712 | Slayton | May 6, 1952 |

FOREIGN PATENTS

| Number | Country | Date |
|---|---|---|
| 357,532 | Great Britain | Sept. 14, 1931 |
| 613,084 | Great Britain | Nov. 22, 1948 |